(12) United States Patent
Diaconu et al.

(10) Patent No.: US 11,099,948 B2
(45) Date of Patent: Aug. 24, 2021

(54) PERSISTENT STORAGE SEGMENT CACHING FOR DATA RECOVERY

(71) Applicant: Microsoft Technology Licensing, LLC, Redmond, WA (US)

(72) Inventors: Cristian Diaconu, Kirkland, WA (US); Vikram Wakade, Sammamish, WA (US); Naveen Prakash, Sammamish, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 161 days.

(21) Appl. No.: 16/138,175

(22) Filed: Sep. 21, 2018

(65) Prior Publication Data
US 2020/0097372 A1 Mar. 26, 2020

(51) Int. Cl.
*G06F 12/08* (2016.01)
*G06F 11/14* (2006.01)
(Continued)

(52) U.S. Cl.
CPC ...... *G06F 11/1471* (2013.01); *G06F 11/1662* (2013.01); *G06F 11/2092* (2013.01);
(Continued)

(58) Field of Classification Search
CPC .... G06F 3/0655; G06F 3/0656; G06F 3/0683; G06F 3/0691; G06F 11/1662;
(Continued)

(56) References Cited

U.S. PATENT DOCUMENTS 6,128,709 A * 10/2000 Autechaud .......... G06F 13/1663
711/100
7,028,154 B2 4/2006 Reeves
(Continued)

FOREIGN PATENT DOCUMENTS

CN 103268292 A 8/2013

OTHER PUBLICATIONS

Persistent Store and Eviction Policy by UserX and Alexey Kukushkin published Aug. 2017 http://apache-ignite-users.70518.x6.nabble.com/Persistent-store-and-eviction-policy-td16092.html (Year: 2017).*
(Continued)

*Primary Examiner* — Joseph O Schell
(74) *Attorney, Agent, or Firm* — Workman Nydegger

(57) ABSTRACT

Caching storage segments (e.g., pages) loaded from a remote storage such that, during recovery, the cached loaded storage segments may be at least partially recovered without reloading the storage segments from the remote storage. During normal operation of a computing system, storage segments are loaded from remote storage into local memory of a computing system. At some point, either due to eviction of the storage segment due to aging out of the storage segment, or due to writing of the storage segment, it is determined to write at least some of the loaded storage segments into local persistent storage. In conjunction with this, the corresponding storage segment is written to a respective storage address of the local persistent storage. Also, a correlation between an identifier of the storage segment and the respective address in the persistent storage is recorded in a persistent data structure.

16 Claims, 8 Drawing Sheets

(51) Int. Cl.
*G06F 16/22* (2019.01)
*G06F 11/16* (2006.01)
*G06F 11/20* (2006.01)
*G06F 12/0868* (2016.01)
*G06F 12/0891* (2016.01)
*G06F 3/06* (2006.01)

(52) U.S. Cl.
CPC ...... *G06F 12/0868* (2013.01); *G06F 12/0891* (2013.01); *G06F 16/221* (2019.01); *G06F 3/0655* (2013.01); *G06F 3/0656* (2013.01); *G06F 3/0683* (2013.01); *G06F 11/2053* (2013.01)

(58) Field of Classification Search
CPC ............. G06F 11/2053; G06F 11/2094; G06F 2003/0691; G06F 16/188; H04L 67/1095; H04L 67/1097
See application file for complete search history.

(56) References Cited

U.S. PATENT DOCUMENTS

| | | | |
|---|---|---|---|
| 7,457,928 B2 | 11/2008 | Evanchik et al. | |
| 8,019,943 B2 | 9/2011 | Yu et al. | |
| 8,094,500 B2 | 1/2012 | Paley et al. | |
| 8,756,375 B2 | 6/2014 | Flynn | |
| 8,904,117 B1* | 12/2014 | Kalekar | G06F 12/0804 711/119 |
| 10,523,755 B1* | 12/2019 | Quach | H04L 65/80 |
| 2001/0002480 A1* | 5/2001 | Dekoning | G06F 3/0689 711/130 |
| 2006/0212644 A1 | 9/2006 | Acton et al. | |
| 2010/0199042 A1* | 8/2010 | Bates | G06F 11/2064 711/114 |
| 2011/0066668 A1* | 3/2011 | Guarraci | G06F 16/27 707/831 |
| 2015/0121126 A1 | 4/2015 | Bradshaw et al. | |
| 2016/0147471 A1* | 5/2016 | O'Hare | G06F 3/067 713/171 |
| 2017/0123675 A1* | 5/2017 | Glazemakers | G06F 3/067 |
| 2018/0074917 A1 | 3/2018 | Choudhary et al. | |
| 2019/0079834 A1* | 3/2019 | De Schrijver | G06F 16/27 |

OTHER PUBLICATIONS

Wikipedia's Page Cache historical version published May 15, 2018 https://en.wikipedia.org/w/index.php?title=Page_cache&oldid=841296688 (Year: 2018).*
"It is All About the Inode" by Adam Cromany published Jun. 10, 2008 https://developer.ibm.com/articles/au-speakingunix14/(Year: 2008).*
"International Search Report and Written Opinion Issued in PCT Application No. PCT/US19/039096", dated Oct. 4, 2019, 11 Pages.
Cohen, et al., "Efficient Logging in Non-Volatile Memory by Exploiting Coherency Protocols", In Proceedings of ACM on Programming Languages, vol. 1, No. 1, Jan. 2017, 24 Pages.
Fan, et al., "H-ARC: A Non-Volatile Memory Based Cache Policy for Solid State Drives", In Proceedings of 30th Symposium on Mass Storage Systems and Technologies, Jun. 2, 2014, 11 Pages.
Ray, et al., "Buffer Pool Extension", Retrieved from: https://docs.microsoft.com/en-us/sql/database-engine/configure-windows/buffer-pool-extension?view=sql-server-2017, Mar. 14, 2017, 8 Pages.
Watumull, et al., "Resilient File System (ReFS) overview", Retrieved from: https://docs.microsoft.com/en-us/windows-server/storage/refs/refs-overview, May 9, 2018, 8 Pages.

* cited by examiner

PERSISTENT STORAGE SEGMENT CACHING FOR DATA RECOVERY

BACKGROUND

A variety of services are now offered in a cloud computing environment. "Cloud computing" is a model for enabling ubiquitous, on-demand network access to a shared pool of configurable computing resources (e.g., networks, servers, storage, applications, and services). A cloud computing model may also come in the form of various application service models such as, for example, Software as a service ("SaaS"), Platform as a service ("PaaS"), and Infrastructure as a service ("IaaS"). The cloud computing model may also be deployed using different deployment models such as private cloud, community cloud, public cloud, hybrid cloud, and so forth. One type of software as a service ("SaaS") is known as database as a service (DBaaS).

Conventional DBaaS is typically implemented within an architecture that includes one primary compute node and one or more secondary compute nodes (each node often provided as a virtual machine). The primary compute node operates a database server and has a directly attached solid state drive that the primary database server may read from and write to. Secondary compute nodes also operate the database server and also have a solid-state drive that the respective secondary database server may read from and write to. The data on the primary compute node is synchronized with the secondary compute nodes.

The secondary compute nodes provide redundancy with the aim of meeting service availability objectives. If the primary compute node was to fail, failover of the database may occur by promoting one of the secondary compute nodes to the primary compute node, and instantiating an additional secondary compute node to maintain the desired level of redundancy.

In order to synchronize the data at the primary compute node with the data at the secondary compute nodes, communication is required from the primary compute node to the secondary compute nodes. The primary compute node keeps a log of operations that occur at the primary compute node. The primary compute node may send the log records (either individually or as a block) to the secondary computing nodes. The secondary compute nodes each apply the operations specified by the primary compute node, and acknowledges such back to the primary compute node. Once the primary compute node receives such an acknowledgement back from a quorum (say two out of three secondary compute nodes), the primary compute node has synchronized its data with the secondary compute nodes to a degree that if the primary compute node goes down, there is a guaranty that a majority of the secondary compute systems will have the log record applied. Thus, in case of recovery, even if the newly elevated primary compute node had not yet applied the log record, that newly elevated primary compute node may still update itself with the current data by consulting with the other secondary compute nodes.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to caching storage segments (e.g., pages) loaded from a remote storage such that, during recovery, the cached loaded storage segments may be at least partially recovered without reloading the storage segments from the remote storage. During operation of a computing system, storage segments are loaded from remote storage into local memory of a computing system. At some point, either due to eviction of the storage segment because of the elapsed of time with no or minimal usage of the storage segment (i.e., the "aging" of the storage segment), or due to writing to the storage segment, it is determined to write at least a loaded storage segments into local persistent storage (i.e., storage whose content survives a power cycle of the computing system).

In conjunction with this, the corresponding storage segment is written to a respective storage address of the local persistent storage. Also, a correlation between an identifier of the storage segment and the respective address in the persistent storage is recorded in a persistent data structure. This process may be repeated for multiple aged or written storage segments. Accordingly, during operation, multiple loaded storage segments pass into the local persistent storage, with multiple correlations between storage segment identifiers and respective address being persisted in the persistent data structure.

Accordingly, even after failure of the computing system, during recovery, when reading storage segments, the persistent data structure is used to determine whether the storage segment is located within the local persistent store. If so, the storage segments may be read from the local persistent store, rather than reading the storage segments afresh from remote storage. Thus, the principles described herein make recovery much more efficient, allowing computing systems to resume operation very quickly after a failure of a computing system.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Therefore, these drawings depict only example embodiments of the invention and are not therefore to be considered to be limiting of the scope of the invention. With this in mind, example embodiments of the invention will be described and explained with reference to the accompanying drawings in which.

DETAILED DESCRIPTION

At least some embodiments described herein relate to caching storage segments (e.g., pages) loaded from a remote storage such that, during recovery, the cached loaded storage segments may be at least partially recovered without reloading the storage segments from the remote storage. During operation of a computing system, storage segments are loaded from remote storage into local memory of a computing system. At some point, either due to eviction of the storage segment because of the elapsed of time with no or minimal usage of the storage segment (i.e., the "aging" of the storage segment), or due to writing to the storage segment, it is determined to write at least a loaded storage segments into local persistent storage (i.e., storage whose content survives a power cycle of the computing system).

In conjunction with this, the corresponding storage segment is written to a respective storage address of the local persistent storage. Also, a correlation between an identifier of the storage segment and the respective address in the persistent storage is recorded in a persistent data structure. This process may be repeated for multiple aged or written storage segments. Accordingly, during operation, multiple loaded storage segments pass into the local persistent storage, with multiple correlations between storage segment identifiers and respective address being persisted in the persistent data structure.

Accordingly, even after failure of the computing system, during recovery, when reading storage segments, the persistent data structure is used to determine whether the storage segment is located within the local persistent store. If so, the storage segments may be read from the local persistent store, rather than reading the storage segments afresh from remote storage. Thus, the principles described herein make recovery much more efficient, allowing computing systems to resume operation very quickly after a failure of a computing system.

First, an example environment that includes a primary compute system, secondary compute system(s), and the storage segment server environment will be described with respect to FIGS. 1 through 5. This example environment is provided for purposes of example only. The principles described herein may be equally applied to any system in which a computing system loads storage segments (such as pages) from a remote storage, and for which recovery may be needed when the computing system fails and local memory cleared due to a power cycle of the computing system. Then, the storage segment server environment will be described in further detail with respect to FIGS. 6 through 8. Then, because components described herein may operate by a computing system, a computing system will then be described with respect to FIG. 9.

Figure 1:
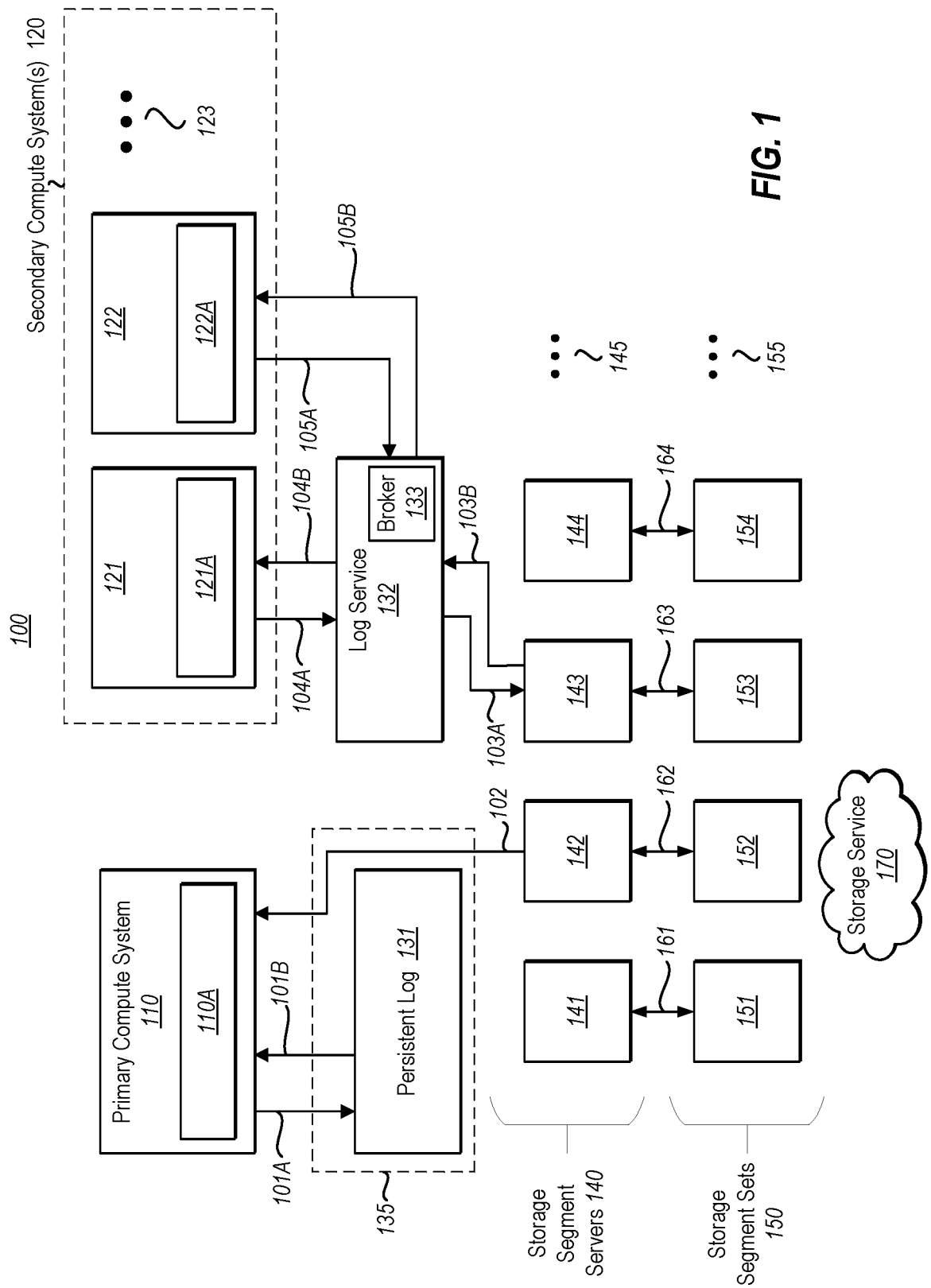
FIG. 1 illustrates an environment in which the principles described herein may be employed, which includes a primary compute system, one or more secondary compute systems, storage segment servers across which data is stored, a persistent log, and a log service for applying log records generated by the primary compute system.

FIG. 1 illustrates an environment 100 in which the principles described herein may be employed. As an example only, the environment 100 may be a network, such as perhaps a cloud computing environment. The environment 100 includes a primary compute system 110 that operates thereon an application 110A. As an example, the application 110A may be a database server application. The primary compute system 110 may be a physical computing system (such as a compute node in a cloud computing environment), in which case the primary compute system 110 may be structured as described below with respect to the computing system 900 of FIG. 9. Alternatively or in addition, the primary compute system 110 may be a virtual machine that emulates a computing system. The application 110A running on the primary compute system 110 performs write operations against user data. For instance, if the application 110A is a database server, the user data would be the database, or at least the content of the database.

The environment 100 also includes secondary compute system(s) 120. Each of the secondary compute system(s) 120 operates a corresponding application, which may be an instance of the very same application that is being run on the primary compute system 110. For instance, if the application 110A on the primary compute system 110 was a database server application, an instance of the database server application may be run on each of the secondary compute system(s) 120. The secondary compute system(s) 120 may each be a physical computing system (such as a compute node in a cloud computing environment), in which case the secondary compute system may be structured as described below with respect to the computing system 900 of FIG. 9. Alternatively or in addition, each secondary compute system(s) 120 may be a virtual machine that emulates a computing system.

The secondary compute system(s) 120 may include any number of secondary compute systems. In the illustrated embodiment, there are two secondary compute systems 121 and 122 illustrated, each operating a respective application 121A and 122A. The ellipsis 123 represents that the principles described herein are not limited to the number of secondary compute system(s) 120. There may even be zero secondary compute system(s), or just one secondary compute system. On the other hand, there may be an innumerable number of secondary compute systems.

Should the primary compute system 110 fail such that recovery is not efficiently possible, one of the secondary compute system(s) 120 might be promoted to be the new primary compute system, thus allowing that promoted compute system to perform write operations. Thus, the secondary compute system(s) 120 allows for there to be built-in redundancy within the environment 100. If a secondary compute system is promoted to be the primary compute system, a new secondary compute system may be started in order to replace the promoted compute system and thereby retain a desired number of secondary compute system(s) 120. On the other hand, secondary compute systems may be added or removed from the set of secondary compute system(s) at will independent of whether the primary compute system 110 has failed.

When the primary compute system 110 performs write operations to user data (e.g., a database), the primary compute system 110 logs (as represented by arrow 101A) those data operations into a persistent log 131. The persistent log 131 is kept so that the environment 100 may recover in case of a failure. The process of the primary compute system 110 writing to a storage segment (e.g., a page of user data), while persistently logging that write operation, will now be described.

Figure 2:
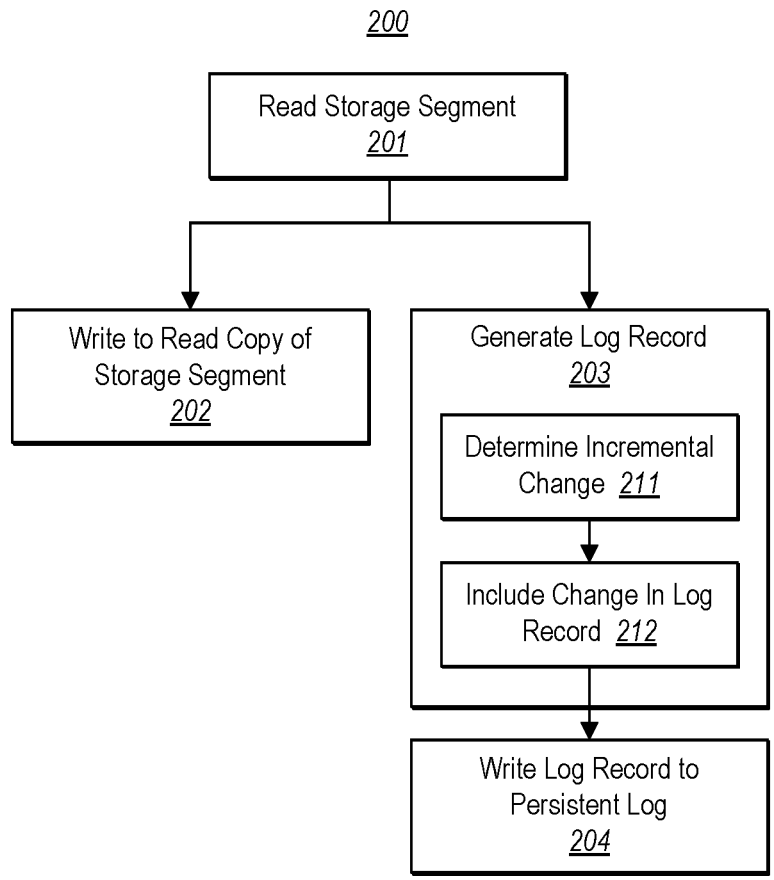
FIG. 2 illustrates a flowchart of a method for generating a log record and performing a write operation.

In particular, FIG. 2 illustrates a flowchart of a method 200 for generating a log record and performing a write operation. As an example, the method 200 may be performed by the primary compute system 110 of FIG. 1. The primary compute system first reads a particular storage segment (act 201). This ensures that a copy of the storage segment is brought into the cache (e.g., local memory) of the primary compute system. The storage segment may have been previously read by the primary compute system, in which case that storage segment will already be within the cache of the primary compute system. Otherwise, the primary compute system performs a read operation from the respective storage segment server that contains the storage segment that is to be written to. In FIG. 1, for instance, the primary compute system 110 reads (as represented by arrow 102) a storage segment (e.g., a page) from the storage segment server 142).

Figure 3:
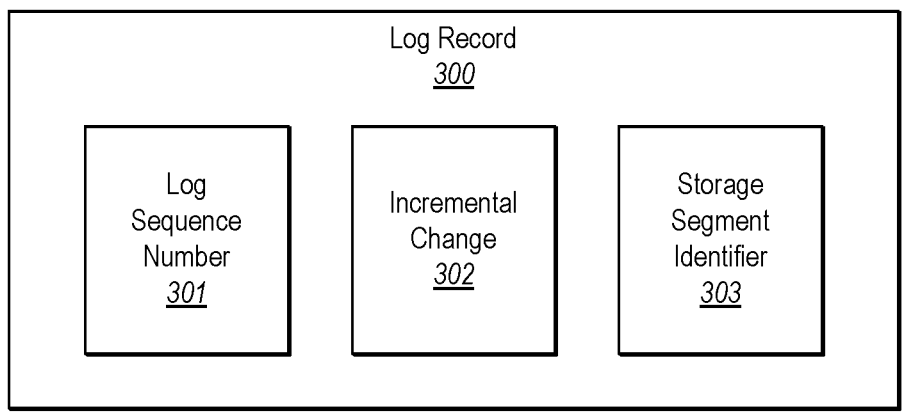
FIG. 3 illustrates a log record that includes a log sequence number, a description of the incremental change to a storage segment, as well as the storage segment identifier to which that change was applied.

The primary compute system then writes to the read (e.g., cached) copy of that storage segment (act 202). Also, to generate a log record of that write operation (act 203), the incremental change made or to be made as part of that write operation is determined (act 211). The primary compute system then creates a log record that includes the incremental change (act 212). For instance, FIG. 3 illustrates a log record 300 that includes a log sequence number 301, description of the incremental change 302, as well as the storage segment identifier 303 to which that change was applied. A log sequence number is a number that uniquely identifies a log record, and that represents a position of the log record within the log. The log sequence number is typically a monotonically increasing number such that the higher the log sequence number, the more recent the log record was placed within the log. The log record is written in a persistent log (act 204). For instance, in FIG. 1, as represented by arrow 101A, the primary compute system 110 writes the log record (e.g., log record 300) into the persistent log 131.

Figure 4:
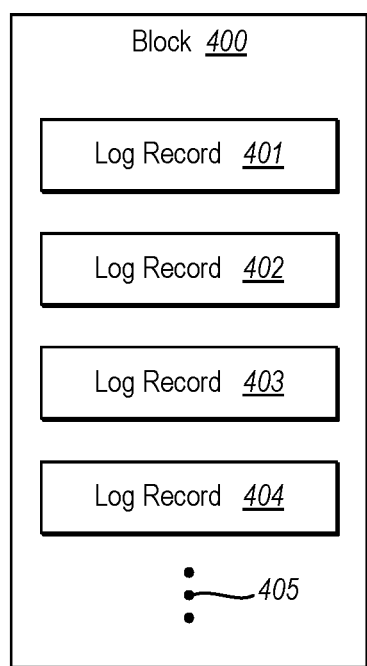
FIG. 4 illustrates a block populated with multiple log records.

In one embodiment, the log records are organized into blocks. A block is a unit of storage that may be written to and read from atomically (i.e., at one time such that the write or read is either completed for the entire block, or abandoned with no write being performed at all). A typical block size will be constant in a computing system, but example block sizes include 512 and 4096 bytes. Because a log record may be much smaller than a block, a block may include multiple log records. FIG. 4 illustrates a block 400 populated with multiple log records 401, 402, 403 and 404. As an example, the log record 300 of FIG. 3 might be the log record 402 of FIG. 4. The ellipsis 405 represents that the block 400 may include any number of blocks that are suitable given the size of a log record, and the size of the block. Each log record may be said to occupy a "slot" within the block. When writing the log record to the persistent log (as represented by arrow 101A of FIG. 1 and act 204 of FIG. 2), it may be a block of log records (such as block 400) that is written to the persistent log. Thus, the primary compute system 110 may wait for some number of log records to be generated before writing the log records as a block to the persistent log 131.

Returning to FIG. 1, the environment 100 also include a log service computing system 132. The log service computing system 132 may be a physical computing system, such as the computing system 900 described below with respect to FIG. 9. Alternatively or in addition, the log service computing system 132 may be a virtual machine, or perhaps may be an executable component, such as the executable component 906 described below with respect to FIG. 9. The log service computing system 132 helps write operations that are performed and logged by the primary computing system 110 to be propagated to the appropriate storage segment server 140, and to the secondary compute system(s) 120.

The environment 100 also includes multiple storage segment servers 140. The data operated upon by the application 110A on the primary compute system 110 is spread across the storage segment servers 140. Each storage segment server is thus for servicing storage segments corresponding to only a portion of the user data. Storage segments may, for instance, be pages of data. Each page of data may include multiple blocks.

For instance, as represented by arrow 161 in FIG. 1, storage segment server 141 performs data operations for only the assigned storage segment set 151. Furthermore, arrow 162 represents that storage segment server 142 performs data operations only for its assigned storage segment set 152, arrow 163 represents that storage segment server 143 performs data operations for only its assigned storage segment set 153, and arrow 164 represents that storage segment server 144 performs data operations for only its assigned the storage segment set 154. The ellipses 145 and 155 represent that the principles described herein are not limited to the number of storage segment servers.

However, identifying which storage segment server is assigned to perform data operations for a given storage segment is simpler if the storage segments (e.g., pages) assigned to any given storage segment are contiguous within the address space of the user data. Furthermore, read operations on continuous storage segments may be more efficiently performed on contiguous storage segments since a single read operation may be issued to return potentially many contiguous storage segments that are contiguous in the address space of the user data. In one embodiment, the user data is represented within a storage service 170 that underlies the storage segment servers 140. The user data distributed across the storage segment servers 140 may maintain the same layout and structure as the user data on the storage service 170.

The storage segment sets 151 through 155 are illustrated collectively as storage segment sets 150. When the storage segment servers 140 store their respective data using the storage service 170 offered by a cloud computing environment, the need to perform size of data operations is eliminated. For instance, such size of data operations may be the performance of a full backup of the entirety of the data. Conventionally, the primary compute system and each of the secondary compute systems would have to perform a full backup separately, by transferring data over a network. Thus, the principles described herein allow for excellent capability to scale the data upwards. However, a copy of the storage segment sets 151 through 155 may also be kept in a cache at each of the respective storage segment servers 141 through 145. This allows for rapid access to the storage segments. But if the storage segment is lost in the cache of the storage segment servers 140 (or even if one of the storage segment servers itself goes down), the storage segment is still available in the storage service 170 in the cloud computing environment.

The volume 135 may be mounted to multiple computing systems. For instance, that single mounted volume 135 may be included within a drive that is mounted to the primary compute system 110 as a read and write volume, while being mounted to the secondary compute system(s) 120 as a read-only volume. Since there is only one computing system mounted to that volume as a write volume, multiple computing systems may be mounted to the volume 135 without risk of corruption of data due to competing or inconsistent write operations. The volume might be within a cloud computing environment as part of a cloud store service.

Figure 5:
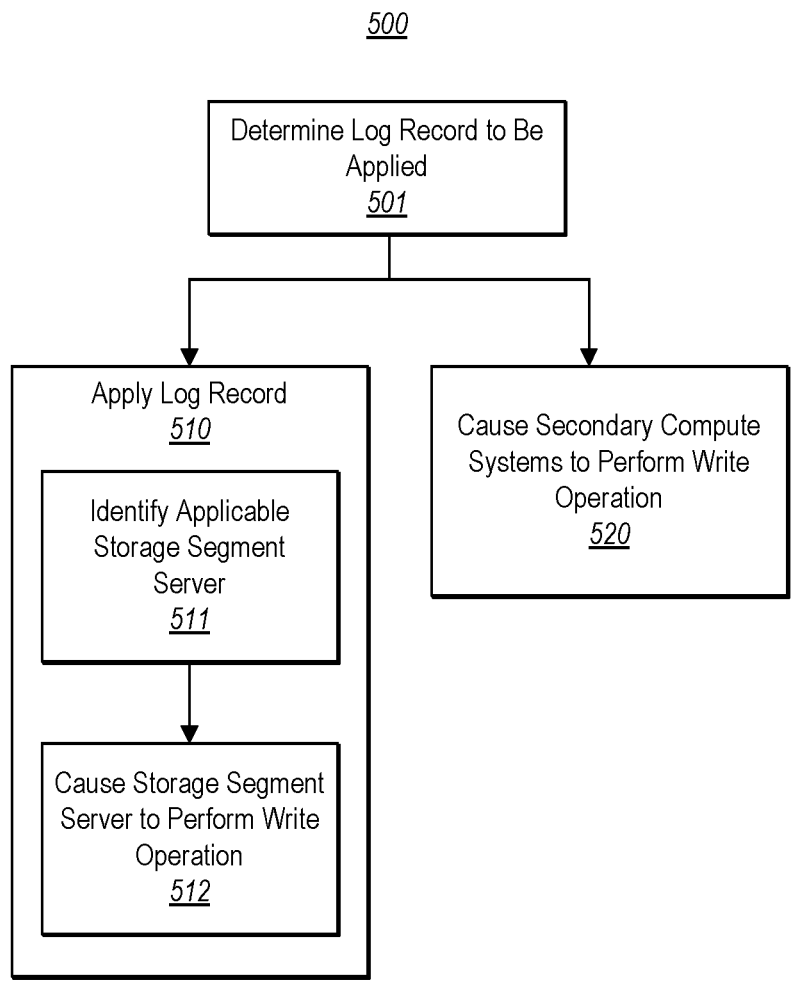
FIG. 5 illustrates a flowchart of a method for applying a log record to storage segments.

FIG. 5 illustrates a flowchart of a method 500 for applying a log record to storage segments in accordance with the principles described herein. The method 500 may be performed for each of multiple log records that are identified as to be applied. Thus, the performance of method 500 many times allows the log to be applied to appropriate storage segments. That is the write operations specified in the log records are applied to the storage segments within the appropriate storage segment servers. As an example, the method 500 may be performed by the log service computing system 132 of FIG. 1. The method 500 may be performed within the environment 100 of FIG. 1, in order to apply the log record 300 of FIG. 3. Accordingly, FIG. 5 will now be described with respect to the FIGS. 1 and 3.

The method 500 is initiated upon determining that a particular log record is to be applied (act 501). For instance, that particular log record may be the log record 300 of FIG. 3. In response to identifying that the particular log record is to be applied (act 501), the particular log record is applied (act 510). This may be done with respect to the particular storage segment server that corresponds to the storage segment. This may also be done with respect to each secondary compute system.

Accordingly, the applying of the log record (act 510) includes identifying a particular storage segment server that is assigned to a particular set of storage segments that includes the particular storage segment to be written to in the particular write operation (act 511). In the case in which the set of storage segments are contiguous in an address space, the assignment of the set of storage segments to each storage segment server may be made to align with the most significant bits of the storage segment identifier. For instance, suppose that the storage segment identifiers range from binary 00000,00000 (comma added every five bits to assist the reader) to binary 01101,01111. In that case, there might be seven storage segment servers, one for storage segments having identifiers with the four most significant bits being 0000, another for the storage segments having identifiers with the four most significant four bits being 0001, and so on, until the seventh storage segment for storage segments having identifiers with the four most significant bits being 0110. Thus, determining which storage segment server is assigned to store a particular storage segment becomes an efficient computation. The log service computing system 132 may thus determine the appropriate storage segment server for the log record 300 based on the storage segment identifier 303.

Then, the particular storage segment server is caused to perform the particular write operation to the particular storage segment designated in the particular log record (act 512). For instance, the log service computing system 132 may provide (e.g., as represented by arrow 103A) the log record 300 to the appropriate storage segment server (say storage segment server 143). This would represent the completion of the write operation that began when the primary compute system 110 read (as represented by the arrow 102) that storage segment from the storage segment server.

In one example, this notification (represented by arrow 103B) is not pushed to the appropriate storage segment server. Instead, it is up to the storage segment server to make inquiry of the log service computing system 132 for the appropriate log records. Thus, the providing of the appropriate log record to the storage segment server may be in response to the request from the particular storage segment server. Thus, the storage segment server 143 assigned to the storage segment written to may be notified of the write operation after the storage segment server 143 asks for applicable log entries (as represented by arrow 103B).

The log service computing system 132 may have a broker component 133 thereon that handles processing of incoming requests for log records. The broker 133 may be an executable component on the log service computing system. For instance, the broker 133 may be structured as described below for the executable component 906 of FIG. 9.

The broker 133 may provide log records not one at a time, but perhaps one block at a time. For instance, if the broker 133 determines that there are any log records (e.g., any of log records 401, 402, 403, 404 or 405) within a block of log records (e.g., block 400) that have a storage segment identifier within the set of storage segments assigned to a particular storage segment server, the broker 133 may send the entire block to the particular storage segment server.

In addition, the broker 133 may ensure that the log record is not communicated to any entity until the log service computing system 132 has been notified that the log record has been securely written into the persistent log 131 (i.e., the log record has become public). This helps the recovery process be consistent. During recovery, the recovery uses the persistent log 131 to determine what operations have been completed. If other components in the system (e.g., a secondary compute system or a storage segment server) has performed operations that the persistent log 131 is not aware of, then the recovery will fail to achieve a reliable state. The user data then becomes ambiguous, and thus corrupt.

The broker 133 may also perform other tasks. For instance, the broker 133 may expect that the primary compute system 110 (which is the source of the generated log records) is unreliable. In order to compensate for that, the broker 133 may implement different policies for deduplicating log records that have been received multiple times from the primary compute system 110. The broker 133 may perform this deduplication by keeping track of the primary compute system generations and by retaining only the latest generation for all log records. The broker 133 may also expect log records to get lost and compensates for that by filling in log records that were missed (e.g., by reading from the fixed-size log portion 601) described below.

Returning to the method 500 of FIG. 5, the log service computing system also causes the secondary compute system(s) to perform the particular write operation on a copy of the storage segment at the secondary compute system (act 520). This may also be performed by communicating (as represented by arrows 104B and 105B in FIG. 1) the log record (e.g., log record 300) to each secondary compute systems 121 and 122. While the log record may be pushed to the secondary compute systems 120, the broker 133 may likewise handle requests for log records (as represented by arrows 104A and 105A) from the secondary compute systems 120. Again, the log records may be provided as a block. As a reminder, the broker 133 may ensure that log records are not communicated to the secondary compute systems 120 unless the log record is already confirmed as written to the persistent log 131. As one possible optimization, the secondary compute system may also perhaps ignore the log record if it is for writing to a storage segment that is not already cached (and thus would cause a read from a storage segment server). In that case, if the secondary compute system was to use that storage segment later, the secondary compute node may read that storage segment from the storage segment server (which already has the write of the skipped log record applied).

Figure 6:
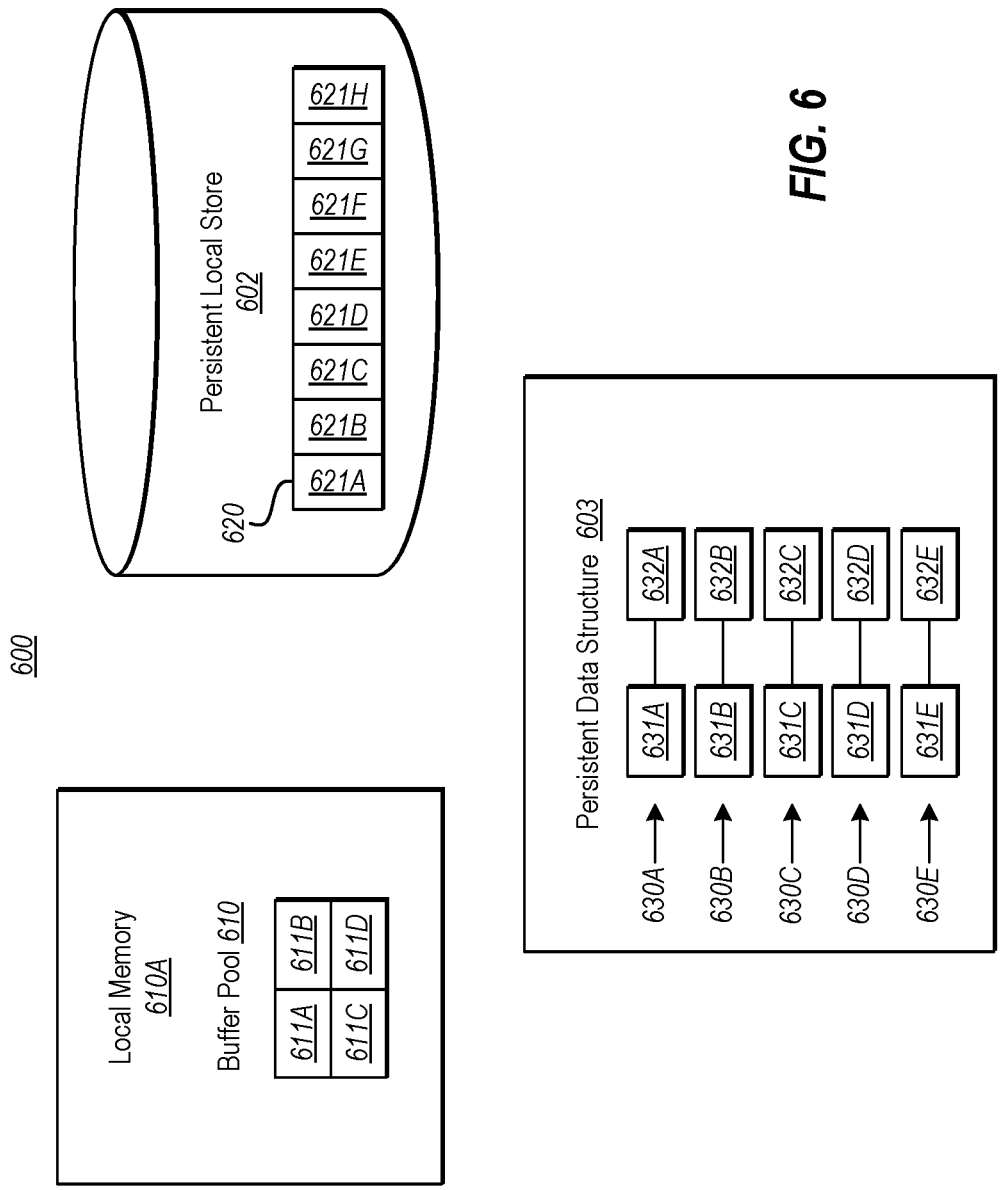
FIG. 6 illustrates a computing system that includes a local memory, a persistent local store, and which has access to a persistent data structure in accordance with the principles described herein.

In one embodiment, the primary compute system 110 has a persistent local storage of storage segments to assist in recovery of the primary compute system 110. Each of the secondary compute systems 120 may also have such a persistent local storage. FIG. 6 illustrates a computing system 600 that includes a local memory 601 and a persistent local store 602 in accordance with the principles described herein. The computing system 600 further includes a persistent data structure 603. The computing system 600 represents an example of the primary compute system 110 and each of the secondary compute system 120. The computing system 600 may be structured as described below for the computing system 900 of FIG. 9.

The local memory 601 is volatile memory, and includes a buffer pool 610. For example purposes, the buffer pool 610 is illustrated as including four address locations 611A, 611B, 611C and 611D (each for holding a storage segment—a page) though a typical buffer pool might contain many more storage locations for holding storage segments. Of course, since the buffer pool 610 is in volatile local memory 601, the buffer pool 610 and its content would be lost should the computing system 600 restart.

The persistent local store 602 is non-volatile storage, and includes a buffer pool extension file 620 that has multiple storage locations. For example purposes, the buffer pool extension file 620 is illustrated as including eight storage locations 621A through 621A through 621H, each for holding a storage segment. Since the buffer pool extension file 620 is within non-volatile storage, the content of the buffer pool extension file 620 (and its content) would be preserved should the computing system 600 restart. However, this does not mean that a recovery process would be able to determine that a storage segment is within any of the storage locations of the local persistent storage, and if so, where that storage segment is within the local persistent storage.

The persistent data structure 603 assists when reading storage segments, whether during normal operation, or whether during a recovery. The persistent data structure 603 may be placed anywhere where a recovery process would know to evaluate during recovery. As an example, the persistent data structure 603 may be located within a master database. The persistent data structure 603 includes multiple correlations 630A through 630E that correlate a respective storage segment identifier 631A through 631E with a respect address 632A through 632E where the storage segment is located within the buffer pool extension file 620 of the local persistent storage 602. The persistent data structure 603 is shown as including five correlations. However, the principles described herein are not limited to the number of correlations recorded within the persistent data structure 603.

In one embodiment, the persistent data structure 603 is a table having a column for the storage segment identifier, and a column for a location of the corresponding storage segment within the local persistent storage. The correlation between two entries in these different columns is implied by the entries being in the same row.

Figure 7:
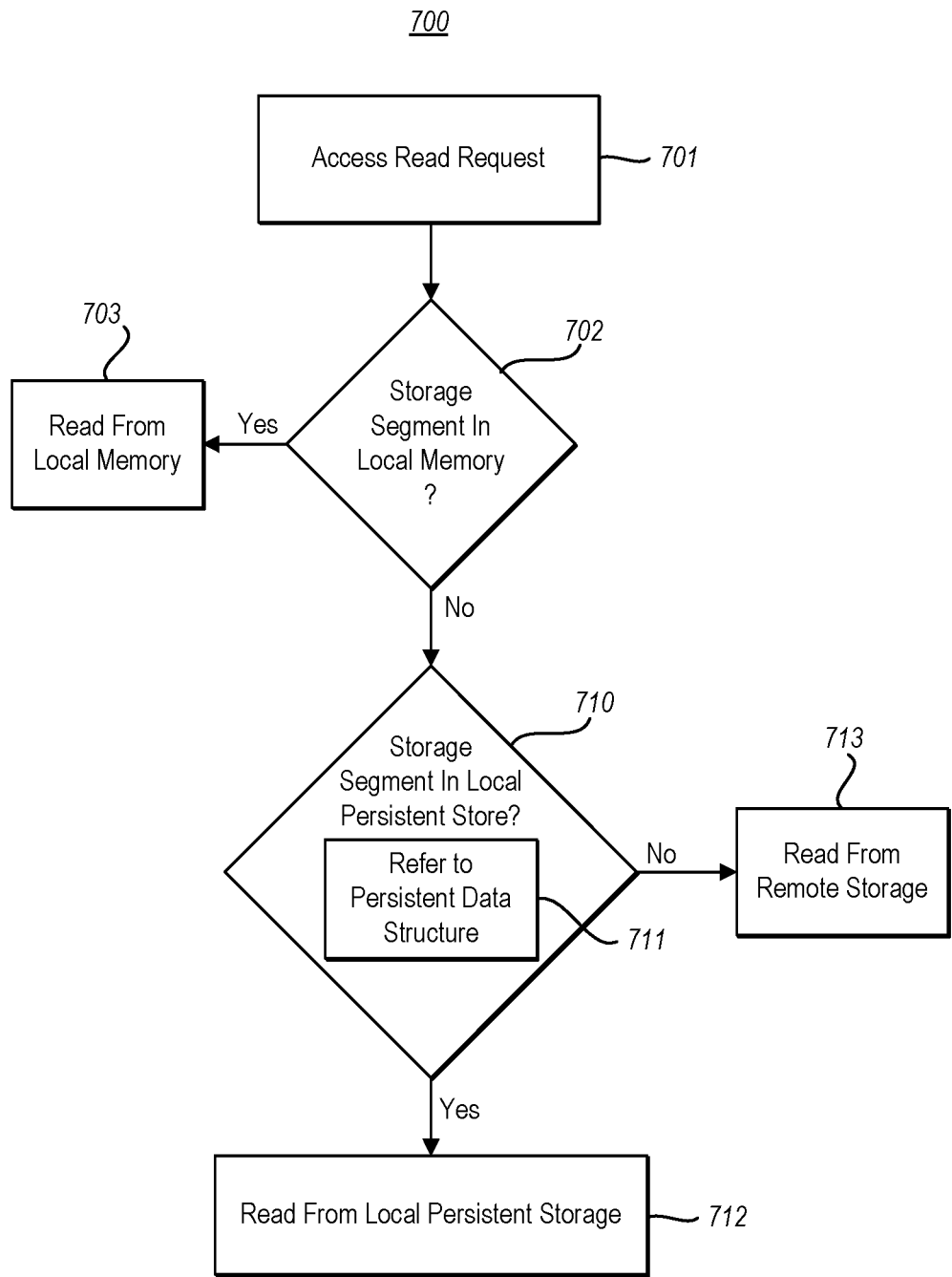
FIG. 7 illustrates a flowchart of a method for reading a storage segment, and illustrates how the persistent local store of FIG. 6 may be used.

FIG. 7 illustrates a flowchart of a method 700 for reading a storage segment, and illustrates how the persistent local store 602 of FIG. 6 is used. The method may be performed by the computing system 600 of FIG. 6. Because the computing system 600 may be the primary compute system 610 or any of the secondary compute system(s) 620, the method 700 may be performed by the primary compute system 610 or any of the secondary compute system(s) 620. The method 700 may be performed the same regardless of whether the computing system has just recovered after a failure, or a failure has not occurred.

First, the computing system (e.g., computing system 600) accesses a read request (act 701). The computing system then determines whether the storage segment is within the local memory (decision block 702). For instance, in FIG. 6, the computing system 600 determines whether the storage segment is within the buffer pool 610 of the local memory 601. If the storage segment is within the local memory ("Yes" in decision block 702), then the computing system simply reads the storage segment from the buffer pool (act 703). For instance, in FIG. 6, if the computing system 600 determines that the storage segment is within the buffer pool 610, the computing system 600 may perform a very fast read of the storage segment from the buffer pool 610.

On the other hand, if the storage segment is not in local memory ("No" in decision block 702), the computing system determines whether the storage segment is within the local persistent storage (decision block 710). For instance, in FIG. 6, the computing system 600 determines whether the storage segment to be read is within the buffer pool extension file 620 within the local persistent storage 602. To do so, the computing system refers to the persistent data structure (act 711). For instance, in FIG. 6, the computing system 600 refers to the persistent data structure 603.

If there is an entry for the identifier of that storage segment in the persistent data structure, then the storage segment is within the local persistent storage segment ("Yes" in decision block 710). For instance, in FIG. 6, if the storage segment has any of the identifiers 631A through 631E, the computing system 600 determines that the storage segment is located within the buffer pool extension file 620, and may also learn the corresponding storage location 632A through 632E of that storage segment within the buffer pool extension file. For instance, if the storage segment identifier is storage segment identifier 631B, then the corresponding storage location is storage location 632B, which might for instance specify the storage location 621D within the buffer pool extension file 620.

The computing system may then read the storage segment from the respective storage address of the local persistent storage (act 712). For instance, in FIG. 6, the computing system 600 may read the storage segment from location 621D of the buffer pool extension file. This may also be a relatively fast read operation. Since this fast read operation may occur after a failure of the computing system, and after a power cycle, recovery is made much faster than if all of the read requests had to be made to remote storage. This is particularly true if there are many storage segments remaining persistently cached within the buffer pool extension fail even after a failure of the computing system.

On the other hand, if there is not an entry of the identifier of the storage segment in the persistent data store ("No" in decision block 710), the storage segment is not in the local persistent storage either. For instance, in FIG. 6, if the storage segment does not have any of the identifiers 631A through 631E, the computing system 600 determines that the storage segment to be read is not located within the buffer pool extension file 620. In that case, the storage segment is loaded from remote storage (act 713). In FIG. 6, the computing system 600 (which could be the primary compute system 110, any of the secondary compute system(s) 120 or any other computing system) loads the storage segment from remote storage. For instance, in FIG. 1, the appropriate computing system 110 or 120 loads the storage segment from the appropriate storage segment server 140.

Figure 8:
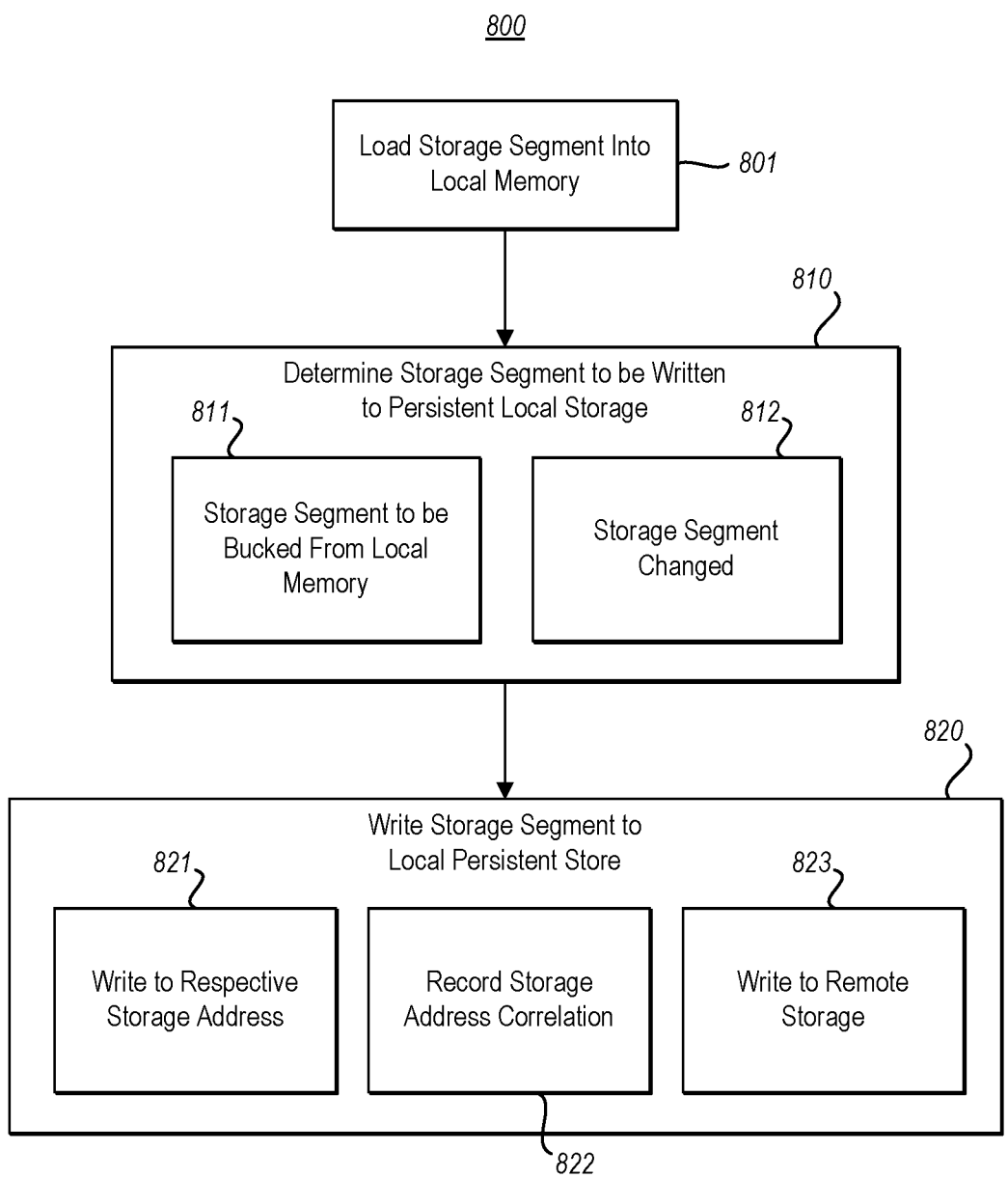
FIG. 8 illustrates a flowchart of a method for caching storage segments loaded from a remote storage in accordance with the principle described herein.

FIG. 8 illustrates a flowchart of a method 800 for caching storage segments loaded from a remote storage in accordance with the principle described herein. The cache occurs such that, during recovery, the cached loaded storage segments may be at least partially recovered without reloading the storage segments from the remote storage. The method 800 may be performed by the computing system 600 of FIG. 6. The method 800 may be performed for each storage segment that is read from remote storage. For instance, in FIG. 1, the method 800 may be performed each time the primary compute system 110 reads a storage segment from any of the storage segment servers 140. Similarly, the method 800 may be performed each time any of the secondary compute system(s) 120 reads a storage segment from any of the storage segment servers 140. Thus, the method 800 assists to allow for later efficient recovery of the primary compute system 110 or any of the secondary compute system(s) 120 should those compute systems fail and require recovery.

The method is initiated upon loading storage segments from remote storage into local memory (act 801). For instance, during a simple read operation, the primary compute system 110 might read a storage segment from any of the storage segment servers 140. The read operation also occurs in preparation for a write operation to that storage segment as previously described with respect to FIG. 2, and more specifically, act 201 of FIG. 2. In FIG. 6, by the computing system 600 reading the storage segment, the storage segment is placed into one of the locations 611A through 611D of the buffer pool 610 within the local memory 601.

The method 800 then includes determining that a loaded storage segment is to be written into local persistent storage (act 810). For instance, in FIG. 6, the computing system 600 may determine that one of the storage segments in the buffer pool 610 is to be written into the buffer pool extension file 602 of the local persistent storage 602. This determination may be made because the storage segment is determined to be evicted from the local memory (act 811). For instance, perhaps the storage segment in local memory simply is not used to a sufficient level to warrant it occupying valuable space within the buffer pool. On the other hand, when overwriting a storage segment in local memory (i.e., when writing a new version of the storage segment), there is a determination that the new content of the storage segment is to be written into the persistent storage (act 812).

In any case, the storage segment is then written into the local persistent storage (act 820). For instance, in FIG. 6, the computing system writes the storage segment into the buffer pool extension file 620 of the persistent local storage 602. The acts shown inside act 820 may be performed atomically as a transaction, such that the acts are either all performed, or none of them are performed.

Specifically, the storage segment is written into a respective storage address of the local persistent store (act 821). For instance, in FIG. 6, the computing system 600 may write the storage segment into the space 621D of the buffer pool extension file 620 of the local persistent store 602. The selection of an available space within the buffer pool extension file may be made by using a linked list of free space descriptors. When a space is utilized, one of the links is taken off the linked list. When a space is freed up (e.g., due to eviction from even the local persistent storage), the linked list of free space descriptors is added to.

In addition, the computing system records that the storage segment is present within the respective storage address in the persistent data structure (act 722). For instance, in FIG. 6, the computing system may record one of the correlations 630 within the persistent data structure 603 to reflect a correlation between the identifier of the storage segment, and the respective storage address in the buffer pool extension file 620).

In case of a write operation to change the version of the storage segment, the write is also made to the remote storage (act 723). For instance, in FIG. 1, the primary compute system 110 or any of the secondary compute system(s) 120 (or any other computing system that happens to be the computing system 600 of FIG. 6) writes to remote storage, such as the appropriate storage segment server 140.

Accordingly, even after failure of the computing system, during recovery, when reading storage segments, the persistent data structure is used to determine whether the storage segment is located within the local persistent store. If so, the storage segments may be read from the local persistent store, rather than reading the storage segments afresh from remote storage. Thus, the principles described herein make recovery much more efficient, allowing computing systems to resume operation very quickly after a failure of a computing system.

Because the principles described herein operate in the context of a computing system, a computing system will be described with respect to FIG. 9. Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, watches, bands, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 9:
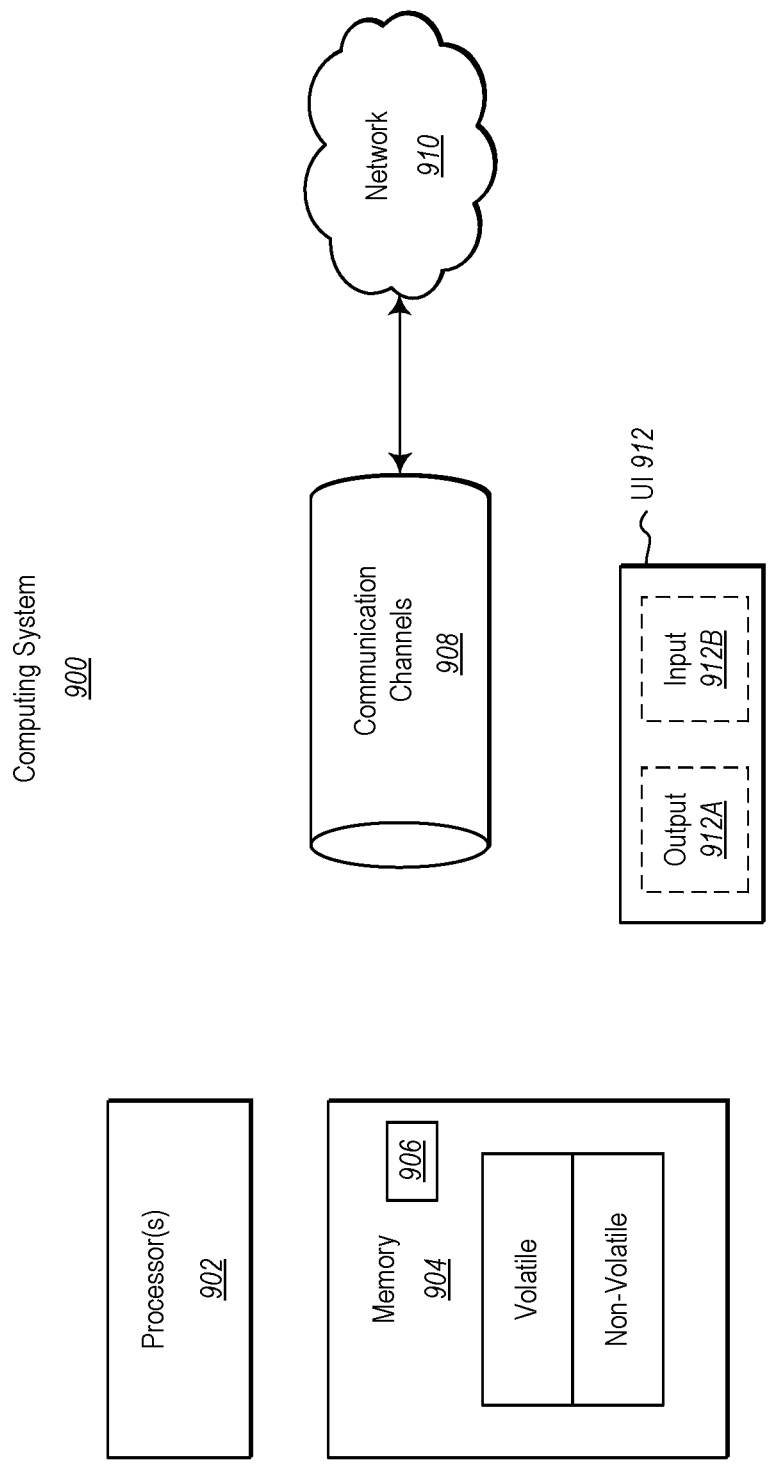
FIG. 9 illustrates an example computer system in which the principles described herein may be employed.

As illustrated in FIG. 9, in its most basic configuration, a computing system 900 typically includes at least one hardware processing unit 902 and memory 904. The memory 904 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 900 has thereon multiple structures often referred to as an "executable component". For instance, the memory 904 of the computing system 900 is illustrated as including executable component 906. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the term "component" or "vertex" may also be used. As used in this description and in the case, this term (regardless of whether the term is modified with one or more modifiers) is also intended to be synonymous with the term "executable component" or be specific types of such an "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 904 of the computing system 900. Computing system 900 may also contain communication channels 908 that allow the computing system 900 to communicate with other computing systems over, for example, network 910.

While not all computing systems require a user interface, in some embodiments, the computing system 900 includes a user interface 912 for use in interfacing with a user. The user interface 912 may include output mechanisms 912A as well as input mechanisms 912B. The principles described herein are not limited to the precise output mechanisms 912A or input mechanisms 912B as such will depend on the nature of the device. However, output mechanisms 912A might include, for instance, speakers, displays, tactile output, holograms, virtual reality, and so forth. Examples of input mechanisms 912B might include, for instance, microphones, touchscreens, holograms, virtual reality, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or components and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface component (e.g., a "NIC"), and then eventually transferred to computing system RAM and/or to less volatile storage media at a computing system. Thus, it should be understood that readable media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses or watches) and the like. The invention may also be practiced in distributed system environments where local and remote computing systems, which are linked (either by hardwired data links, wireless data links, or by a combination of hardwired and wireless data links) through a network, both perform tasks. In a distributed system environment, program components may be located in both local and remote memory storage devices.

Those skilled in the art will also appreciate that the invention may be practiced in a cloud computing environment, which is supported by one or more datacenters or portions thereof. Cloud computing environments may be distributed, although this is not required. When distributed, cloud computing environments may be distributed internationally within an organization and/or have components possessed across multiple organizations.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand, self-service, broad network access, resource pooling, rapid elasticity, measured service, and so forth. A cloud computing model may also come in the form of various application service models such as, for example, Software as a service ("SaaS"), Platform as a service ("PaaS"), and Infrastructure as a service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system configured to cache storage segments loaded from a remote storage such that, during recovery, the cached storage segments being recoverable without reloading the cached storage segments from the remote storage, said computing system comprising:
one or more processors; and
one or more computer-readable storage media that store instructions that are executable by the one or more processors to cause the computing system to at least:
load a storage segment from a remote storage into a buffer pool located in local memory of the computing system, the local memory of the computing system comprising volatile memory;
determine that the storage segment, which is loaded in the buffer pool, is to be written into a buffer pool extension located in a local persistent storage of the computing system, the local persistent storage of the computing system comprising non-volatile storage;
write the storage segment to a storage location within the buffer pool extension;
within a persistent data structure associated with the buffer pool extension, generate a record of the storage segment that is written to the buffer pool extension, the record correlating a storage segment identifier of the storage segment with an address where the storage segment is written within the buffer pool extension; and
based upon a read request to read a second storage segment for recovery of the computing system, perform at least:
determine whether the second storage segment is stored within the buffer pool;
subsequent to determining the second storage segment is not stored within the buffer pool, query the persistent data structure to determine whether a second storage segment identifier of the second storage segment is recorded within the buffer pool extension;
subsequent to determining the second storage segment identifier is not recorded within the buffer pool extension, determine that the second storage segment is to be loaded from the remote storage, which is located remotely to the computing system; and
load, into the buffer pool, the second storage segment from the remote storage.

2. The computing system in accordance with claim 1, wherein writing the storage segment is performed in response to a determination that the storage segment is to be evicted from the buffer pool.

3. The computing system in accordance with claim 1, wherein writing the storage segment is performed in response to a determination that the storage segment has been overwritten in the buffer pool.

4. The computing system in accordance with claim 3, wherein writing the storage segment is also performed at the remote storage.

5. The computing system in accordance with claim 4, wherein writing the storage segment to the buffer pool extension and to the remote storage is performed as atomic transactions.

6. The computing system in accordance with claim 1, wherein the second storage segment is also written to the buffer pool extension.

7. The computing system in accordance with claim 6, the read request occurring after a failure of the computing system.

8. The computing system in accordance with claim 1, the persistent data structure being a table having a column for the storage segment identifier, and a column for the address where the storage segment is written within the buffer pool extension.

9. A method for caching storage segments loaded from a remote storage such that, during recovery, the cached storage segments are recoverable without reloading the storage segments from the remote storage, the method comprising:
loading a storage segment from a remote storage into a buffer pool located in local memory of a computing system, the local memory of the computing system comprising volatile memory;

determining that the storage segment, which is loaded in the buffer pool, is to be written into a buffer pool extension located in a local persistent storage of the computing system, the local persistent storage of the computing system comprising non-volatile storage;

writing the storage segment to a storage location within the buffer pool extension;

within a persistent data structure associated with the buffer pool extension, generate a record of the storage segment that was written to the buffer pool extension, the record correlating a storage segment identifier of the storage segment with an address where the storage segment is written within the buffer pool extension; and upon receiving a read request to read a second storage segment for recovery of the computing system, perform at least:

determine whether the second storage segment is stored within the buffer pool;

subsequent to determining the second storage segment is not stored within the buffer pool, query the persistent data structure to determine whether a second storage segment identifier of the second storage segment is recorded within the buffer pool extension;

subsequent to determining the second storage segment identifier is not recorded within the buffer pool extension, determine that the second storage segment is to be loaded from the remote storage, which is located remotely to the computing system; and load, into the buffer pool, the second storage segment from the remote storage.

10. The method in accordance with claim 9, wherein writing the storage segment is performed in response to a determination that the storage segment is to be evicted from the buffer pool.

11. The method in accordance with claim 9, wherein writing the storage segment is performed in response to determining that the storage segment has been overwritten in the buffer pool.

12. The method in accordance with claim 11, wherein writing the storage segment is also performed at the remote storage, and wherein writing the storage segment to the buffer pool extension and to the remote storage is performed atomic transactions.

13. The method in accordance with claim 9, wherein the second storage segment is also written to the buffer pool extension.

14. The method in accordance with claim 13, the read request occurring after a failure of the computing system.

15. The method in accordance with claim 9, the persistent data structure being a table having a column for the storage segment identifier, and a column for the address where the storage segment is written within the buffer pool extension.

16. A computing system configured to cache storage segments loaded from a remote storage such that, during recovery, the cached storage segments are recoverable without reloading the cached storage segments from the remote storage, said computing system comprising:

one or more processors; and one or more computer-readable storage media that store instructions that are executable by the one or more processors to cause the computing system to at least:

load a storage segment from a remote storage into a buffer pool located in local memory of the computing system, the local memory of the computing system comprising volatile memory;

determine that the storage segment, which is loaded in the buffer pool, is to be written into a buffer pool extension located in local persistent storage of the computing system, the local persistent storage of the computing system comprising non-volatile storage;

write the storage segment to a storage location within the buffer pool extension;

within a persistent data structure associated with the buffer pool extension, generate a record of the storage segment that is written to the buffer pool extension, the record correlating a storage segment identifier of the storage segment with an address where the storage segment is written within the buffer pool extension; and in response to receiving a read request to read a second storage segment for recovery of the computing system, perform at least:

determine whether the second storage segment is stored within the buffer pool;

subsequent to determining the second storage segment is not stored within the buffer pool, query the persistent data structure to determine whether a second storage segment identifier of the second storage segment is recorded within the local buffer pool extension;

subsequent to determining the second storage segment identifier is not recorded within the buffer pool extension, determine that the second storage segment is to be loaded from the remote storage, which is located remotely to the computing system;

load, into the buffer pool, the second storage segment from the remote storage; and load, into the buffer pool extension, the second storage segment.

* * * * *